(12) United States Patent
Egan et al.

(10) Patent No.: US 7,518,813 B1
(45) Date of Patent: Apr. 14, 2009

(54) METHODS AND STRUCTURE FOR DETECTING ANOMALOUS EVENTS IN A DISK DRIVE USING VGA VARIANCE

(75) Inventors: Curtis Egan, Thornton, CO (US); David R. Finamore, Louisville, CO (US)

(73) Assignee: Maxtor Corporation, Scotts Valley, CA (US)

( * ) Notice: Subject to any disclaimer, the term of this patent is extended or adjusted under 35 U.S.C. 154(b) by 208 days.

(21) Appl. No.: 11/140,642

(22) Filed: May 27, 2005

Related U.S. Application Data

(60) Provisional application No. 60/577,732, filed on Jun. 7, 2004.

(51) Int. Cl.
  G11B 5/02 (2006.01)
  G11B 21/02 (2006.01)
  G11B 5/09 (2006.01)
  G11B 27/36 (2006.01)

(52) U.S. Cl. ............... 360/25; 360/31; 360/75; 360/67; 360/46; 702/33; 702/113

(58) Field of Classification Search .................. None
  See application file for complete search history.

(56) References Cited

U.S. PATENT DOCUMENTS

| | | | |
|---|---|---|---|
| 5,831,781 A * | 11/1998 | Okamura | 360/31 |
| 6,226,140 B1 * | 5/2001 | Serrano et al. | 360/60 |
| 6,529,342 B1 * | 3/2003 | Feng et al. | 360/75 |
| 6,671,110 B2 * | 12/2003 | Baba et al. | 360/31 |
| 6,683,737 B2 * | 1/2004 | Gong et al. | 360/31 |
| 7,158,325 B1 * | 1/2007 | Hu et al. | 360/69 |
| 7,310,195 B1 * | 12/2007 | Schreck et al. | 360/75 |
| 2003/0103287 A1 * | 6/2003 | Agematsu | 360/60 |
| 2005/0185312 A1 * | 8/2005 | Ueda et al. | 360/31 |

* cited by examiner

*Primary Examiner*—Andrew L Sniezek
(74) *Attorney, Agent, or Firm*—Westman, Champlin & Kelly, P.A.

(57) ABSTRACT

Methods and structures for detecting touchdown of the read/write head on its recording surface or for detecting other read signal amplitude modulations as proportional to variance of the value of the read channel variable gain amplifier ("VGA"). Variance in the VGA values caused by the standard feedback control electronics associated therewith is proportional to amplitude modulations of the sensed signal picked up by the read channel (or servo read sensor). These amplitude modulations are, in turn, reflective of flying height of the read/write head as well as generally indicative of other parameters of the read channel operation. Touchdown of the read/write head and other parameters of the disk drive operation may therefore be detected as variances in the VGA control values.

28 Claims, 7 Drawing Sheets

Figure 2
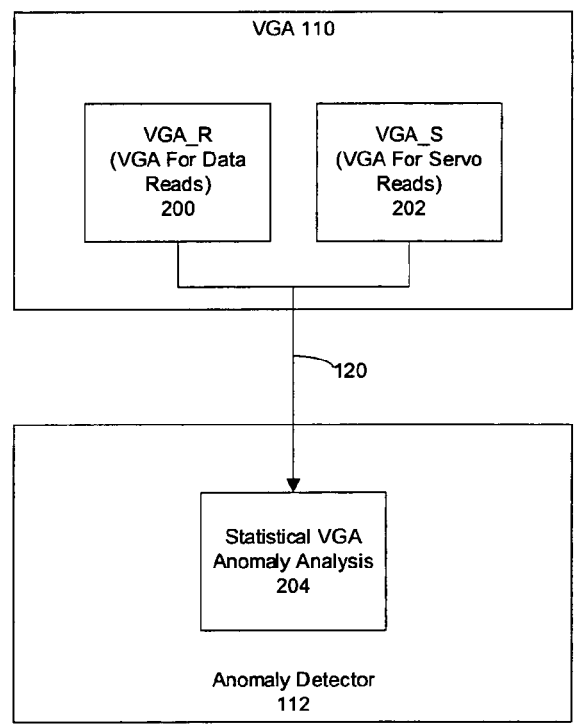
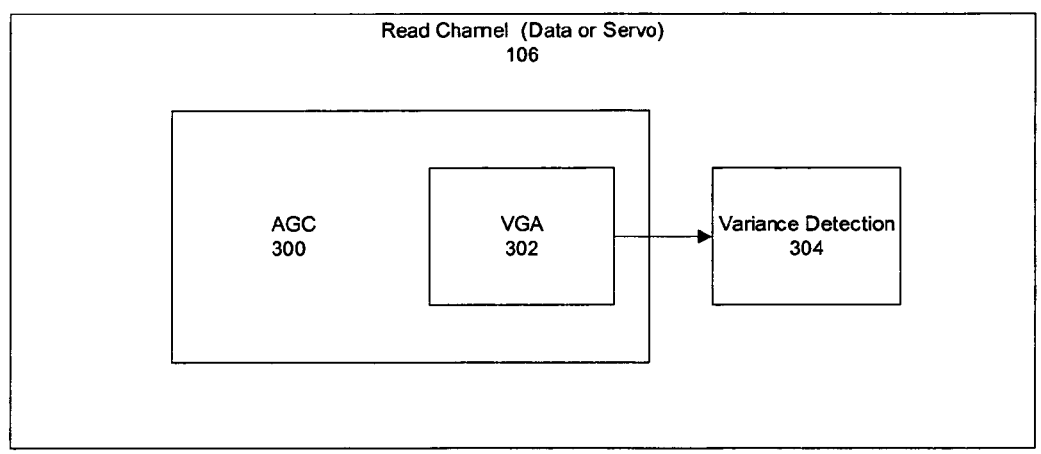
Figure 3

METHODS AND STRUCTURE FOR DETECTING ANOMALOUS EVENTS IN A DISK DRIVE USING VGA VARIANCE

RELATED PATENT APPLICATION

This patent application is related to and claims priority to U.S. Provisional Patent Application Ser. No. 60/577,732 filed 7 Jun. 2004 and entitled: Method of Detecting Touchdown or Amplitude Modulation of Disk Drive Head using Variation of Voltage Gain Circuitry in Read Channel which is hereby incorporated by reference.

BACKGROUND OF THE INVENTION

1. Field of the Invention

The invention relates generally to disk drive control structures and techniques and in particular relates to improved methods and structures for detecting anomalous conditions within a disk drive. Exemplary anomalous conditions may include, for example: detection of touchdown of the air bearing surface of the read/write head on the surface of the recording medium and detection of quality defects on the surface of the recording medium.

2. Discussion of Related Art

Present day disk drives store and retrieve information on a rotating recording media while a read/write head "flies" in close proximity above the surface of each recordable medium. Typically, multiple such recording surfaces and corresponding read/write heads are integrated within a single disk drive device to allow for enhanced performance and capacity.

The recording media may be either optically encoded or magnetically encoded to store data. In general, an optical recording medium records and retrieves information by altering and then sensing optical properties of the recording medium surface. A magnetically encoded recording surface records and senses magnetic flux changes on the magnetizeable surface of the recording medium. In general, the medium is rotated as the read/write head flies in close proximity above the surface of the recordable medium. Multiple concentric tracks or cylinders are typically configured at incrementing radial positions on the recording medium surface and each track consists of a plurality of bits representing the stored data and associated meta-data.

During normal operation of a disk drive, it is critical that the read/write head should not make contact with the surface of the recording medium for an extended period of time. Such physical contact between the read/write head and the surface of the recording medium may cause permanent damage to the read/write head and/or to the recording medium surface thereby potentially losing previously recorded data and/or disabling the disk drive. To this end, an air bearing surface ("ABS") is designed to maintain a relatively constant "flying height" of the read/write head over the recording medium surface. The mechanical design of the air bearing surface of the read/write head is the principle control mechanism to maintain a safe flying height above the recording medium surface rotating adjacent the read/write head. Since the recordable medium rotates at a relatively constant speed, and since other environmental parameters are relatively stable, the aerodynamic properties of the air bearing surface maintain a substantially constant spacing between the read/write head and the rotating recording medium.

Various control mechanisms are applied to refine control of the flying height of the read/write head above the rotating recording medium. During the manufacture process of a disk drive, it may be desirable to permit touchdown or contact between the read/write head and its corresponding recording medium surface so as to calibrate the feedback control mechanisms used to more accurately maintain a constant flying height. By allowing such contact or touchdown of the read/write head on the recording medium, the feedback control mechanisms for maintaining head flying height may be properly calibrated for a baseline value associated with touchdown or contact with the recording medium surface. Thus, slight variations in mechanical tolerances and electrical properties of the disk drive as well as those of the recording medium surface may be accounted for by calibrating each head for touchdown with its corresponding surface.

Present techniques for determining or detecting such head-surface contact or touchdown during manufacturing test and calibration procedures generally utilize other sensing mechanisms within the disk drive that are indirectly indicative of head touchdown. For example, most presently known touchdown or contact detection mechanisms utilize the position error sensing ("PES") control features of the disk drive to sense the likely occurrence of touchdown between the read/write head and its corresponding recording surface. The PES sensing and control mechanisms of the disk drive perform fine adjustments to properly position the read/write head radially to a desired track or cylinder location. The PES feedback mechanisms senses errors in attempts to read servo information recorded at fixed locations on the rotating recording medium. As the fly height of the read/write head changes, within a few rotations of the recording medium, the position error sensing feedback control mechanism may determine that a significant enough change or trend of changes in the position error signals may represent a head touchdown.

A number of problems arise in existing touchdown detection mechanisms that depend on sensing changes in the PES related signals. First, detecting head touchdown from such a PES feedback loop signal may require multiple rotations of the rotating recording medium due to the relatively slow control feedback loops used in such PES control systems. Permitting multiple revolutions of the rotating recording medium when a head touchdown condition is presently occurring may cause undue wear of the recording surface and/or of the read/write head. In addition, the PES feedback control mechanisms are significantly impacted by the skew angle of the read/write head relative to the present radial track position. The skew angle is the angle of the read/write head relative to the tangential angle of a given track over which the head is positioned. Thus, use of the PES feedback in control mechanisms for the additional purpose of detecting touchdown of the read/write head on its corresponding recording medium surface may be limited to certain specific ranges of radial positions where the skew angle is large. At track locations where the skew angle is small or zero, this approach will have difficulties because there is no tangential force.

It is evident from the above discussion that a need exists for an improved method and structure for detecting touchdown of the read/write head on its corresponding recording medium surface.

SUMMARY OF THE INVENTION

The present invention solves the above and other problems, thereby advancing the state of the useful arts, by providing methods and structures for detecting read/write head touchdown using the variable gain amplifier ("VGA") associated with operation of the read/write head. The current fly height of the read/write head is substantially proportional to the present value of the VGA as controlled by automatic gain control electronics ("AGC") of the read channel during operation. Well known AGC feedback/control electronics of the read channel continuously adjust the VGA value to maintain an appropriate signal level for further processing of the sensed signal. As the fly height of the read/write head changes, the VGA is automatically adjusted to maintain an appropriate signal level for further processing of sensed signals in the read channel. In particular, if the air bearing surface ("ABS") of the head contacts the rotating medium, the head will vibrate with a resonant frequency. The resonant frequency of these vibrations will cause corresponding adjustments to the VGA to compensate for the vibrating head changes in flying height. Features and aspects hereof periodically sense the value of the VGA as adjusted by the read channel AGC electronics to detect touchdown of the read/write head. The sensing of the VGA value may be implemented through software/firmware of the disk drive controller on a sector by sector basis or may be implemented in custom hardware circuits to permit more frequent sensing to be performed.

Still other features and aspects hereof more generally permit sensing of amplitude modulation of the read channel proportional to the VGA value and caused by other operational factors of the disk drive. Such other factors may include, for example, recording surface anomalies. In addition, sensing other amplitude modulations of the read channel by sensing the VGA value may be useful to verify proper error recovery operation of the read channel in a manufacturing test environment. By monitoring and/or periodically sensing the VGA values the telltale signature of head-disk surface contact is detected as variance in the amplitude modulation of the read head signal. As the head signal modulates, so does the value applied to the VGA of the read channel—substantially in proportion to the head-disk surface contact. Thus, by monitoring the variance in the VGA values, any source of head-disk surface contact may be detected—whether the contact is purposeful or not.

A first feature hereof provides a disk drive having a read/write head and a corresponding recording surface and including: a read channel associated with the read/write head and having a feedback controlled variable gain amplifier ("VGA"); and a detector coupled to detect an anomaly in operation of the disk drive as a function of statistical changes in values related to the VGA feedback control.

Another aspect hereof further provides that the detector comprises programmed instructions executed within a disk drive controller of the disk drive.

Another aspect hereof further provides that the detector comprises a circuit associated with the read channel.

Another aspect hereof further provides that the detector is adapted to detect touchdown of the read/write head on the corresponding recording surface.

Another aspect hereof further provides that the detector is adapted to detect a quality defect on the surface of the corresponding recording surface.

Another aspect hereof further provides that the detector detects statistical variance in values related to the VGA feedback control.

Another aspect hereof further provides that the detector detects standard deviation in values related to the VGA feedback control.

Another aspect hereof further provides that the read channel includes a data read channel having a VGA_R signal representing values of the VGA of the data read channel and wherein the detector is adapted to detect the anomaly as a function of statistical changes in values related to the VGA_R signal.

Another aspect hereof further provides that the read channel includes a servo read channel having a VGA_S signal representing values of the VGA of the servo read channel and wherein the detector is adapted to detect the anomaly as a function of statistical changes in values related to the VGA_S signal.

Another feature hereof provides a read channel circuit usable in a disk drive for reading information on a rotating recording medium associated with a read/write head coupled to the read channel, the read channel circuit including: an automatic gain control ("AGC") circuit including a variable gain amplifier ("VGA") and an associated feedback control circuit to automatically adjust the VGA in response to feedback sensing of signals detected by the read channel; and a variance detection circuit for detecting statistical variance in adjustments to the VGA by the AGC that represent anomalous conditions of the disk drive.

Another aspect hereof further provides that the variance detection circuit is adapted to detect variations in the flying height of the read/write head based on the detected variance of VGA adjustments.

Another aspect hereof further provides that the variance detection circuit is further adapted to detect touchdown of the read/write head on the surface of the recording medium based on the detected variance of VGA adjustments.

Another aspect hereof further provides that the variance detection circuit is adapted to detect quality defects in the surface of the recording medium based on the detected variance of VGA adjustments.

Another feature hereof provides a read channel in a disk drive controller adapted for reading and writing information on a rotating recording medium associated with a read/write head coupled to the controller through the read channel, the read channel including: an automatic gain control ("AGC") circuit including a variable gain amplifier ("VGA") and an associated feedback control circuit to automatically adjust the VGA in response to feedback sensing of signals detected by the read channel; and variance detection means within the controller coupled to sense the adjustments to the VGA and adapted for detecting statistical variance in adjustments to the VGA by the AGC that represent anomalous conditions of the disk drive.

Another aspect hereof further provides that the variance detection means is adapted to detect variations in the flying height of the read/write head based on the detected variance of VGA adjustments.

Another aspect hereof further provides that the variance detection means is further adapted to detect touchdown of the read/write head on the surface of the recording medium based on the detected variance of VGA adjustments.

Another aspect hereof further provides that the variance detection means is adapted to detect quality defects in the surface of the recording medium based on the detected variance of VGA adjustments.

Another feature hereof provides an apparatus in a disk controller having a read/write head and a corresponding rotating recording surface, the apparatus comprising: a read channel coupled to the read/write head for sensing information recorded on the rotating recording medium; and a touchdown detector communicatively coupled to the read channel and adapted to detect touchdown of the read/write head at any radial position on the recording surface regardless of the skew angle of the read/write head relative to tracks on the recording surface based on information derived from the read channel.

Another aspect hereof further provides that wherein the read channel includes a variable gain amplifier ("VGA") automatically controlled by an automatic gain control ("AGC") circuit including a feedback control logic circuit, and wherein information derived from the read channel by the touchdown detector further comprises variance in the value of the VGA by the AGC.

Another feature hereof provides a method for detecting anomalous conditions in operation of the disk drive having a read/write head and an associated rotating recordable medium, the method comprising: sensing values applied to a variable gain amplifier ("VGA") by an automatic gain control ("AGC") feedback control circuit associated with the read/write head; and detecting an anomalous condition as a function of statistical changes of the sensed values applied to the VGA.

Another aspect hereof further provides that the step of detecting further comprises: detecting touchdown of the read/write head on the recording medium as a function of variance of the sensed values.

Another aspect hereof further provides that the step of detecting further comprises: detecting quality defects on the recording medium as a function of variance of the sensed values.

Another aspect hereof further provides that the VGA comprises a data read channel VGA ("VGA_R") and wherein the step of detecting further comprises: detecting an anomalous condition as a function of statistical variance of the sensed values applied to the VGA_R.

Another aspect hereof further provides that the VGA comprises a servo read channel VGA ("VGA_S") and wherein the step of detecting further comprises: detecting an anomalous condition as a function of statistical variance of the sensed values applied to the VGA_S.

Another aspect hereof further provides that the step of detecting further comprises: detecting an anomalous condition as a function of variance of the sensed values applied to the VGA.

Another aspect hereof further provides that the step of detecting further comprises: detecting an anomalous condition as a function of standard deviation of the sensed values applied to the VGA.

Another feature hereof provides in a disk controller, an apparatus comprising: means for gathering spectral energy in a predetermined frequency band associated with a read/write head in the disk drive; and means for detecting an anomalous condition in the operation of the disk drive in response to detecting spectral energy above a predetermined threshold value in the predetermined frequency band.

Another aspect hereof further provides that the predetermined frequency band is a frequency band surrounding a resonant frequency of vibration of the read/write head.

Another aspect hereof further provides that the predetermined frequency band is 50-300 kHz.

Another aspect hereof further provides that the means for gathering further comprises: means for computing statistical variance of values applied to a variable gain amplifier ("VGA") associated with the read/write head.

Another feature hereof provides a method operable in a disk drive having a disk controller coupled to a read/write head where the read/write head is associated with a variable gain amplifier ("VGA"), the method comprising: gathering spectral energy in a predetermined frequency band associated with the read/write head in the disk drive; and detecting an anomalous condition in the operation of the disk drive in response to detecting spectral energy above a predetermined threshold value in the predetermined frequency band.

Another aspect hereof further provides that the predetermined frequency band is a frequency band surrounding a resonant frequency of vibration of the read/write head.

Another aspect hereof further provides that the predetermined frequency band is 50-300 kHz.

Another aspect hereof further provides that the step of gathering further comprises: computing statistical variance of values applied to a variable gain amplifier ("VGA") associated with the read/write head.

BRIEF DESCRIPTION OF THE DRAWINGS

FIG. 2 is a block diagram providing additional details of an exemplary statistical VGA anomaly analysis element in accordance with features and aspects hereof.

FIG. 3 is a block diagram providing additional details of an exemplary statistical VGA anomaly analysis element in accordance with features and aspects hereof.

DETAILED DESCRIPTION OF THE DRAWINGS

Figure 1:
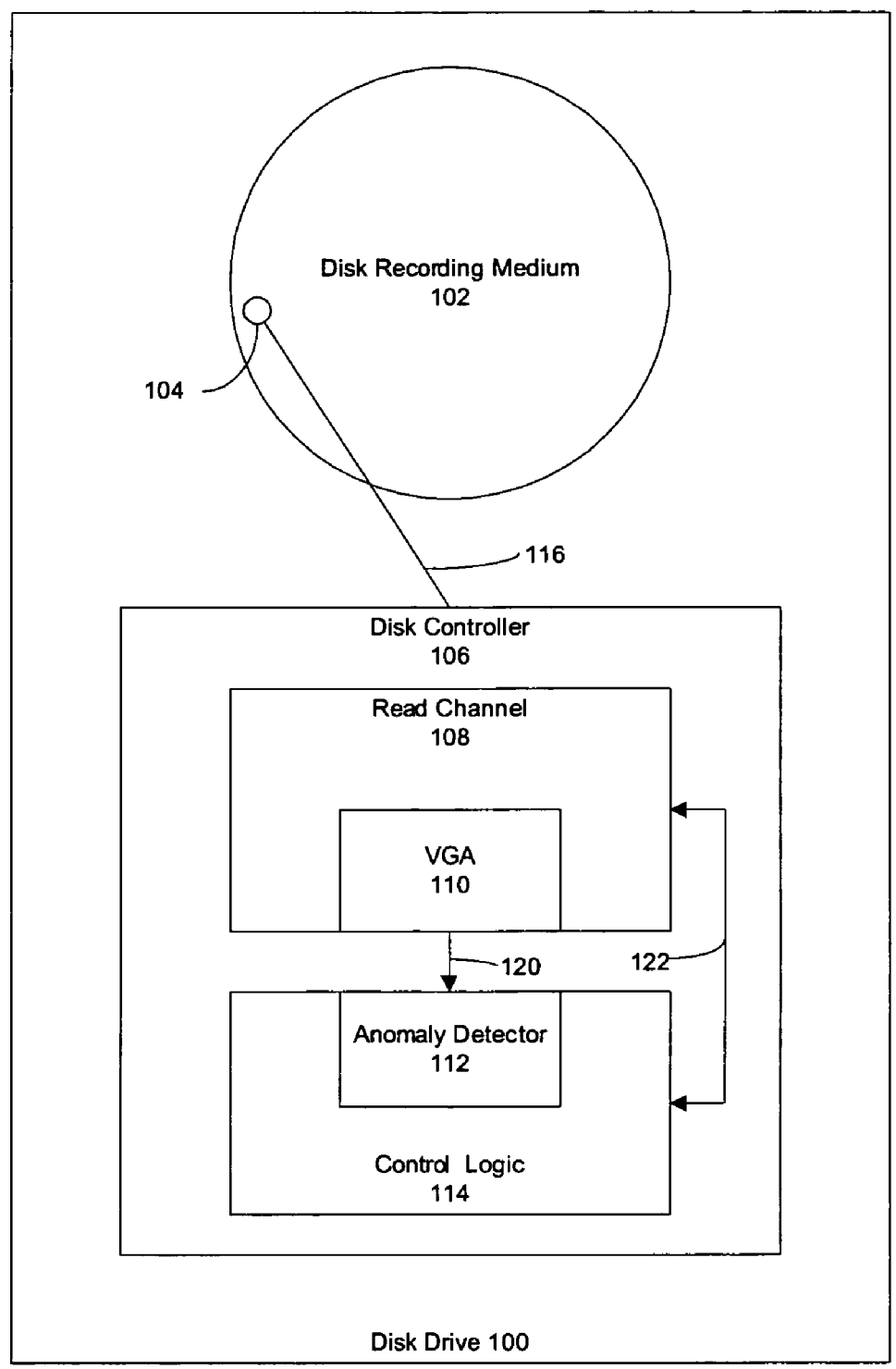
FIG. 1 is a block diagram of a disk drive enhanced in accordance with features and aspects hereof to detect anomalous events in the disk drive as a function of statistical measures of the VGA values.

FIG. 1 show an exemplary disk drive 100 embodying features and aspects hereof to detect anomalous events or conditions within the operating disk drive 100. The events or conditions are sensed based upon statistical measures of automated adjustments to the variable gain amplifier ("VGA") of the disk drive's read channel 108. Disk drive 100 may include one or more rotating disk recording media 102 each associated with a corresponding read/write head 104. Read/write head 104 is attached to one end of pivoting actuator arm 116 controlled by servo mechanisms (not shown) associated with disk controller 106. As is well known in the art, disk controller 106 moves actuator arm 116 to position read/write head 104 at a desired radial position on rotating recording medium 102. Also as is generally known in the art, actuator arm 116 may represent a plurality of such actuator arms movable in unison each affixed to a corresponding read/write head 104 flying above a corresponding surface of multiple rotating recording media 102. Such multiple surfaces in disk drive designs coupled with corresponding multiple read/write heads is well known to those of ordinary skill in the art.

Disk controller 106 generally comprises a micro-controller or micro-processor and suitable programmed instructions for performing desired control functions within the disk drive 100. In addition to the general purpose programmability of such a micro-controller, controller 106 typically includes one or more custom circuits, often integrated within a single integrated circuit along with the micro-controller and associated program instructions. The custom circuits provide particular features such as servo control mechanisms and various feedback control sensing circuits, host device interfacing, and other control and sense features of the disk drive. Such servo control mechanisms (not shown) are used, for example, for controlling rotational speed of the recording medium 102, for radially positioning the read/write head 104 on the actuator arm 116, etc. Other servo control mechanisms may be utilized, for example, to monitor and adjust the height of a read/write head 104 flying above its corresponding rotating recording medium 102. Such general purpose micro-controllers and servo control devices are well known to those of ordinary skill in the art both as discrete circuit components and tightly integrated in VLSI integrated circuit devices.

With respect to features and aspects hereof, disk controller 106 includes a read channel circuit 108 adapted for sensing and decoding signals generated by read/write head 104 corresponding to previously recorded information on the rotating recording medium 102. Read channel circuit 108 may be controllably configured for reading previously recorded data signals or may be controllably configured for reading previously recorded servo location information. Often, the signaling characteristics and/or encoding for data read by a read channel 108 versus servo information read by a read channel 108 may differ. Control logic features of the disk controller 106 may controllably and selective adjust parameters of a single read channel 108 to enable reading of data signals or servo signals. Alternatively, as generally known to those of ordinary skill in the art, multiple such read channel circuits 108 may be provided each adapted for sensing different signal levels and encodings.

Read channel 108 typically includes an automatic gain control feature ("AGC") useful for automatically adjusting the gain of an amplifier used in read channel 108 to amplify the signals sensed by read/write head 104. Such an AGC feature includes a feedback control mechanism used to automatically adjust the value of a variable gain amplifier 110 ("VGA"). As signals are sensed by read channel 108, the AGC circuitry automatically adjusts a programmable parameter value applied to VGA 110 to improve the quality of signals sensed by read/write head 104. The improved, amplified signal is then processed further within other circuits of read channel 108 to decode the encoded information sensed therein.

Control logic 114 represents other control functions and/or circuits operable to control operations of disk drive 100. Control logic 114 and read channel 108 are often integrated within a single, integrated circuit package and logically perform a variety of both integrated and distinct functions. Path 122 represents a logical coupling of the features and functions of read channel 108 with control logic 114 for overall control and operation of disk drive 100.

In accordance with features and aspects hereof, functionality of control logic 114 may include anomaly detector 112. Anomaly detector 112 senses changes in the value applied to VGA 110 by the AGC of read channel 108. Path 120 represents the logical coupling of the anomaly detector 112 with VGA 110 to permit sensing of changes in the VGA 110 value. As noted above and as discussed further herein below, anomaly detector 112 samples the present value of VGA 110 to detect statistically relevant changes in the automated control of VGA 110 that may represent occurrence of various anomalies in operation of disk drive 100. Exemplary of such anomalies is the physical touchdown of read/write head 104 on its corresponding recording medium 102 surface. Another exemplary anomaly that may be sensed by anomaly detector 112 may include surface quality defects or irregularities on recording medium 102. These and other anomalies in operation of the disk drive may be sensed as statistical variance of the value of VGA 110.

As is well known in the art, various functions of control logic 114 may be implemented as suitably programmed instructions in a general or special purpose micro-processor or micro-controller operable within disk controller 106. Where anomaly detector 112 is implemented as such programmed instructions operable in a micro-controller, the statistical analysis to be performed may be accomplished through periodic programmed sampling of the present value of VGA 110. Alternatively, as well known to those of ordinary skill in the art, features and aspects of anomaly detector 112 may be implemented as custom circuits integrated with read channel 108 and/or integrated with control logic 114. The degree of integration among the various components within this controller 106 is a matter of design choice well known to those of ordinary skill in the art. The block diagram of FIG. 1 is therefore intended merely as representative of one exemplary functional decomposition of certain relevant features and functions within an exemplary disk controller 106 enhanced in accordance with features and aspects hereof. Numerous equivalent structures for incorporating anomaly detector features and aspects hereof will be readily apparent to those of ordinary skill in the art. In particular, numerous other components and features not shown in FIG. 1 will be readily apparent to those of ordinary skill in the art for controlled operation of disk drive 100.

FIGS. 2 and 3 provide additional details of exemplary embodiments for implementing desired anomaly detection within a disk controller as shown in FIG. 1. In FIG. 2, VGA 110 may include two distinct functional elements—namely: VGA_R 200 VGA_R and VGA_S 202. VGA_R 200 represents a variable gain amplifier as suitably programmed for data read operations in a typical read channel while VGA_S 202 represents typical VGA values associated with sensing servo data in an appropriate read channel. VGA_R 200 and VGA_S 202 may represent distinct circuits within VGA 110 or may simply represent suitably programmed parameters for operation of VGA 110 under different operating conditions (i.e., when reading recorded data versus reading of servo information). The present values of VGA_R 200 VGA_S 202 may be read via path 120 by anomaly detector 112. In particular, statistical VGA anomaly analysis element 204 periodically samples the present VGA values to detect occurrence of possible anomaly conditions. Statistical VGA anomaly analysis element 204 represents programmed instructions or electronic circuits for performing desired statistical analysis on a sequence of sampled values for VGA 110. As noted above, standard statistical variance or standard deviation analysis may be utilized for detecting such anomalous operating conditions of the disk drive.

FIG. 3 shows another exemplary embodiment where the variance detection element 304 is embedded as a part of the read channel 106 circuitry. As noted above, read channel 106 may be either a data read channel or a servo read channel defined either by customizing appropriate circuitry for distinct read channels or by suitably programming parameters for a common read channel used for both reading of recorded data and reading of servo data. AGC 300 within read channel 106 automatically varies the value of VGA 302 two adjust the gain of the sensed read signal. Variance detection element 304, in accordance with features and aspects hereof, senses a sequence of changes to VGA 302 to allow detection of anomalous operating conditions within the associated disk drive. As noted above, anomalous conditions such as physical touchdown between a read/write head and its corresponding recording medium surface or such as recording medium surface defects may be detected through such statistical analysis means, circuits and methods.

Those of ordinary skill in the art will readily recognize that the structures shown in FIGS. 1 through 3 are intended merely as representative of possible embodiments of features and aspects hereof. Numerous equivalent structures and degrees of integration with other features and functions of the disk controller will be readily apparent to those of ordinary skill in the art as typical design choices.

In present day disk controller technologies using a VGA as noted above, the frequency of the feedback control loop applying values to the VGA is much faster than the typical resonant frequency of vibrations in the ABS following contact with the recording surface. For example, in most present day head structures, the resonant frequency of such head vibrations tends to be in the range of 50-300 kHz. By contrast, the control loop structures applying changed values to the VGA to adapt for flying height changes typically operates at frequencies in the 1-3 MHz range. Thus, VGA changes may occur at a frequency of at least about 10× the resonant frequency of the head vibrations caused by the head-disk surface contact.

Further, as noted above, other anomalies such as disk surface defects or irregularities may also be sensed as variance in the values applied to the VGA. Such defects or irregularities tend to present even lower frequency changes to the VGA values and thus are even more easily detected by the fast adjustments and sampling of VGA values.

Figure 9:
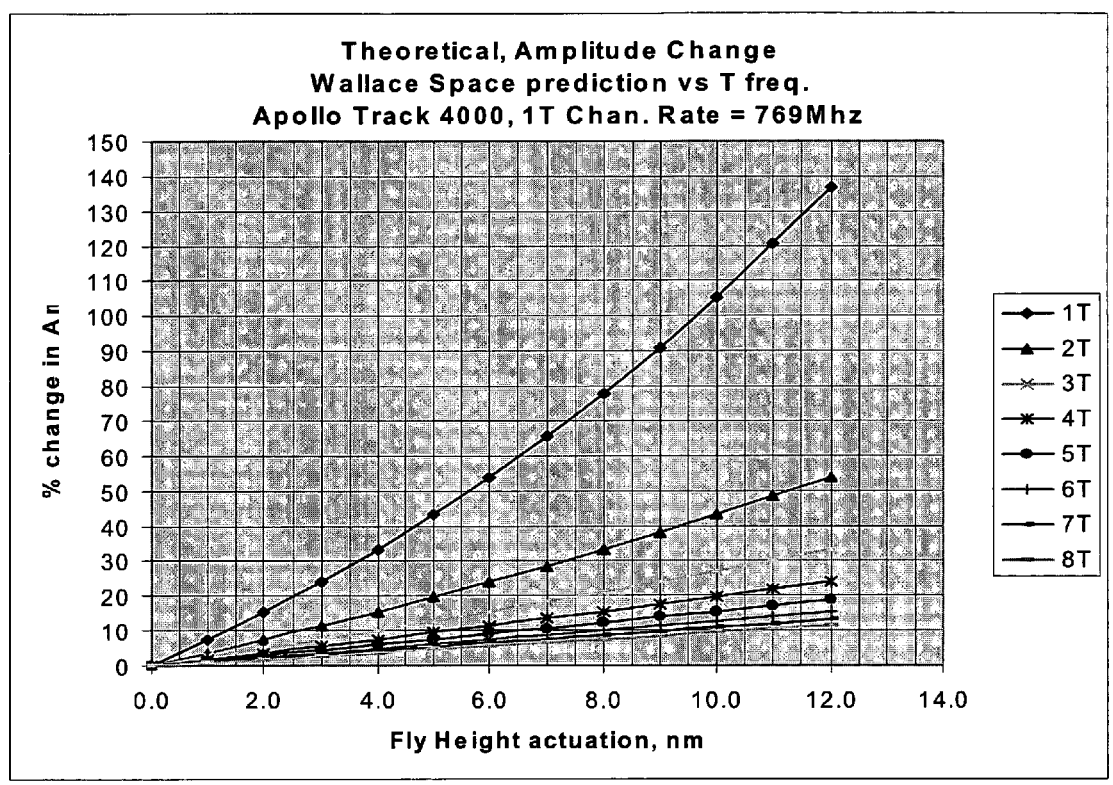
FIG. 9 is a graph representing test data evidencing utility of sensing statistical variance of VGA values as indicative of read/write head touchdown.
Figure 10:
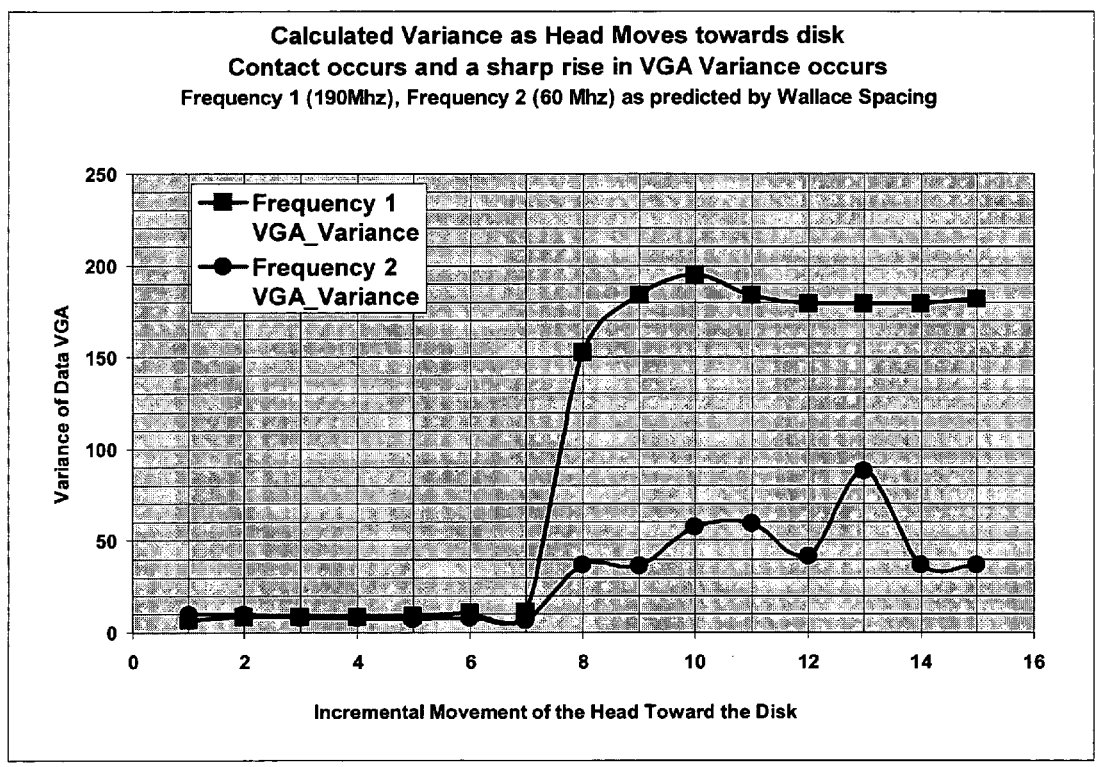

FIGS. 9 and 10 are graphs showing test data evidencing the utility of sensing statistical variance in the VGA value for both data read channel operation and servo read channel operation over a variety of discrete time domain frequencies. First, FIG. 9 demonstrates the Wallace spacing loss (i.e., flying height) impacts the amplitude changes in the sensed signal (and hence the gain setting of the VGA). As shown in FIG. 9, higher frequency signals are more severely impacted by changes in the head flying height than are lower frequency signals. However, it is clear from the graph that the Wallace spacing loss is evident at virtually all frequencies of practical use in present day disk drives. Though not specifically shown in the graph of FIG. 9, the frequency of servo information reads is also impacted by the Wallace spacing loss effect—i.e., is similarly affected by head flying height.

FIG. 10 next shows the dramatic change in variance of the VGA values sensed at two exemplary frequencies due to head-disk surface contact (i.e., imposed by the flying height changes caused by the head resonant vibrations). The VGA variance may be computed in accordance with well known statistical equations. Sample variance is a measure of the spread of or dispersion within a set of sample data. The sample variance is the sum of the squared deviations from their average divided by one less than the number of observations in the data set. For example, for n observations $x_1, x_2, x_3, x_n$ with sample mean:

$$\bar{x} = \frac{\sum x_i}{n}$$

the sample variance is given by $$s^2 = \frac{1}{n-1} \sum (x_i - \bar{x})^2$$

FIG. 10 shows the variance of changes to the VGA values for two different frequencies in response to head-disk surface contact. As can be seen in the graph, the change in variance is dramatic at a flying height of approximately 8 nm movement of the head toward the disk surface (i.e., at contact of the head with the disk surface).

Further, those of ordinary skill in the art will recognize that since the VGA value is not affected by the head to track skew angle, the detection of head-disk surface contact by this variance measure is not impacted by the radial position of he head. Essentially the same variance measure can be detected at any radial track location on the disk surface.

Stated another way and more generally, features and aspects hereof provide for detection of head-disk surface contact by gathering spectral energy in the range of frequencies associated with the ABS resonant oscillations caused by a head-disk surface contact or other anomalous conditions of the disk drive operation.

Figure 4:
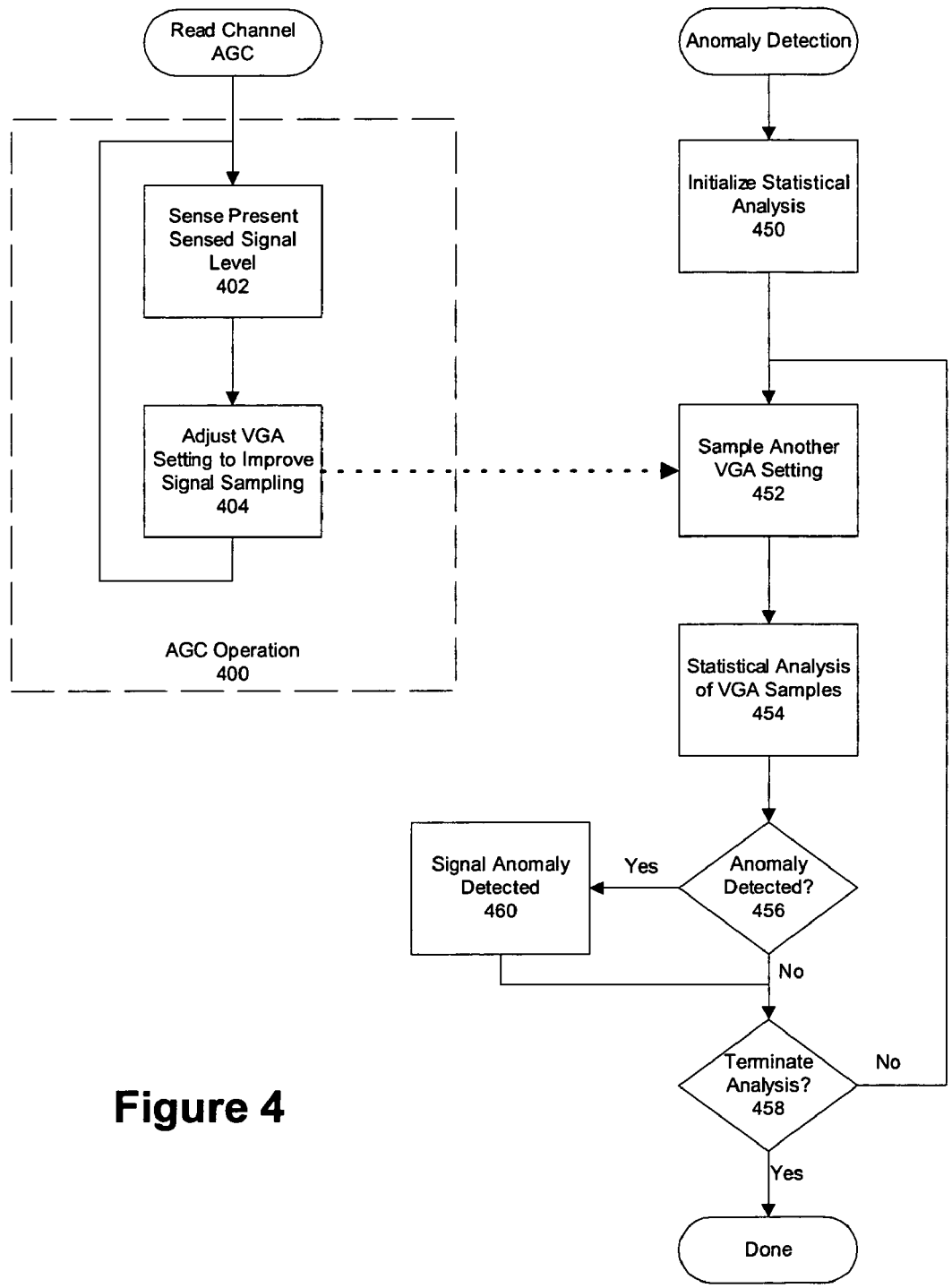
FIG. 4 is a flowchart describing a method in accordance with features and aspects hereof to statistically analyze VGA value to detect anomalous events in operation of the disk drive.

FIGS. 4 through 8 are flowcharts describing exemplary methods and processes operable within a disk controller enhanced in accordance with features and aspects hereof. In particular, FIG. 4 is a flowchart describing the overall operation of a disk controller enhanced with anomaly detection features and aspects hereof. Still more specifically, FIG. 4 shows a method for anomaly detection operable in association with a read channel's AGC operation to automatically adjust the VGA values in the read channel. Element 400 of FIG. 4 represents an abstraction of overall AGC operation in a read channel of a disk controller. In general, the AGC is operable to monitor the level of the presently sensed signal from the read/write head associated with the read channel and to automatically adjust the VGA values of the read channel to improve the signal sampling quality. Element 402 of FIG. 4 is therefore operable to sense the present signal level of the signal generated from the read/write head and element 404 is operable to automatically adjust the VGA value to maintain signal quality of the sensed signal. Elements 402 and 404 are iteratively operable while the read channel is operating sensing either recorded data or previously recorded servo information.

While the read channel AGC is operable to automatically and continuously adjust the VGA value to maintain read signal quality, an anomaly detection method hereof is operable to statistically analyze the sequence of adjustments of the VGA value to thereby sense potential anomalies in operation of the associated disk drive. Element 450 is therefore operable to initialize statistical analysis to begin the anomaly detection process. Such initialization may consist of any appropriate setting of statistical variables and accumulators. Element 452 is then operable to sample another updated VGA value by sensing the present value of the VGA as set under control of the AGC of the read channel. Element 454 is then operable to perform desired statistical analysis on the sequence of VGA sampled values previously acquired. The particular statistical analysis to be performed may be simple standard deviation computations, statistical variance computations, etc. Such statistical formulae and computational methods are well known to those of ordinary skill in the art.

As noted elsewhere herein, the methods hereof may be implemented as programmed instructions operable in programmable general or special purpose processors or may be implemented as custom circuits tightly integrated in the design of the read channel logic. In this latter case, those of ordinary skill in the art will recognize that real time sampling and analysis may be conducted so as to detect anomalous events in near real time. By contrast, the overhead processing of an implementation using programmed instructions in a processor may not permit such rapid detection but none the less provides improved detection by comparison with prior known techniques which may require multiple full rotations of the recording medium.

Element 456 is then operable to determine whether a particular anomaly has been detected in the sequence of VGA values sensed and analyzed by operation of elements 452 and 454. If an anomaly has been detected as indicated by the statistical analysis of previously sampled VGA values, element 460 is operable to generate an appropriate signal or message indicating that some anomaly has been detected. As noted above, exemplary of such anomalies are physical touchdown of the read/write head on its corresponding rotating, recording medium surface as well as detection of surface quality defects on the rotating, recording medium.

In either case, whether an anomaly has been detected or not, element 458 is then operable to determine whether VGA value statistical analysis should continue or has been terminated by some external control methodology or means (not shown). If the VGA sampling statistical analysis is to continue, processing continues by looping back to element 450 to acquire a next sampled VGA value and to perform continuing statistical analysis on the sequence of most recently sensed VGA values. Eventually, external control logic will reset or otherwise terminate the anomaly detection feature thus completing operation of the method of FIG. 4.

As noted herein, anomaly detection methods may be implemented as suitably programmed instructions executed by a general or special purpose processor within the disk controller. Such a software/firmware solution may periodically sample VGA values under software/firmware control as feasible. For example, each sector transferred in a read operation as the recording medium rotates under the current position of the head read/write head may generate an appropriate interrupt signal to allow the software/firmware operable within the disk controller's micro-controller to again periodically sample the current VGA value. Thus, within a single revolution of the recording medium, a significant number of such VGA value samples may be sensed and utilized in statistical analysis.

Alternatively, the method of FIG. 4 may be implemented as custom circuits associated with, or integrated with the read channel circuitry. Thus, the anomaly detection sampling and analysis loop comprising elements 452 through 458 may be operable as a function of the logic circuits implementing the AGC operation. In such a hardware/circuit implementation, every change of the VGA value by AGC operation 400 as shown in element 404 may generate another sample to be statistically analyzed as indicated by elements 452 through 460. Such design choices for implementing the anomaly detection either in software/firmware or as custom circuits present well-known matters of design choice for those of ordinary skill in the art. In particular, a software/firmware solution may be capable of integration with existing, legacy disk drives and their associated disk controllers without requiring hardware reconfiguration, modification, or redesign.

The statistical variance of the sequence of VGA values may be determined in accordance with standard statistical techniques as discussed above. Those of ordinary skill in the art will recognize other standard statistical analysis functions and computations that may be applied to recognize physical touchdown of the read/write head, recording media defects, or other quality related and error recover cover related anomalies. Further, a programmable threshold or set point may be established through well-known techniques and structures for adapting or configuring the anomaly detection methods and means in accordance with the needs of the particular disk drive application. The programmable threshold or limit values may be used to determine whether a given statistical measure of variance may be indicative of an anomalous event to be recognized by the anomaly detection features and aspects hereof.

Figure 5:
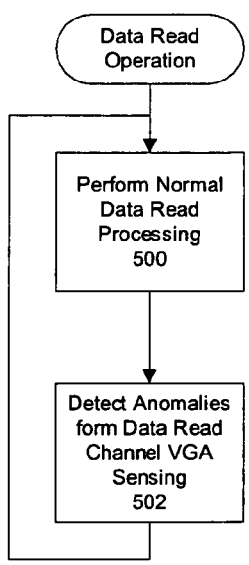
FIG. 5 is a flowchart describing parallel operation of exemplary anomalous event detection in conjunction with data read channel operation in accordance with features and aspects hereof.
Figure 6:
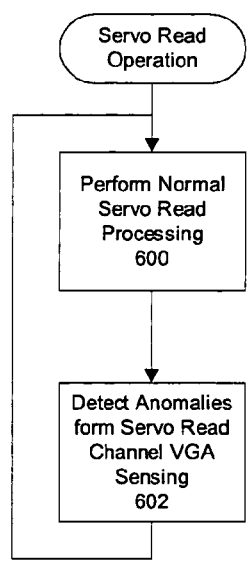
FIG. 6 is a flowchart describing parallel operation of exemplary anomalous event detection in conjunction with servo read channel operation in accordance with features and aspects hereof.

As discussed above, sensing of VGA value changes may be performed in parallel with normal operation of the AGC in the read channel during a data read operation or during a servo read operation. FIGS. 5 and 6 represent these abstract higher level processes in which normal data read operations and normal servo read operations are utilized to perform the desired VGA sensing for anomaly detection. As shown in FIG. 5, a normal data read operation may be performed as indicated by element 500. Element 502 may detect anomalies in parallel by sensing changes and the VGA values during such normal data read operations. In like manner, FIG. 6 shows use of a normal servo read operation as indicated by element 600 in parallel with detection of potential anomalies by element 602 sensing the VGA values associated with the servo read operation. As noted above, FIGS. 5 and 6 may represent processing on the VGA_R or VGA_S signals, respectively, corresponding to data read channel operations and servo read channel operations, respectively.

Figure 7:
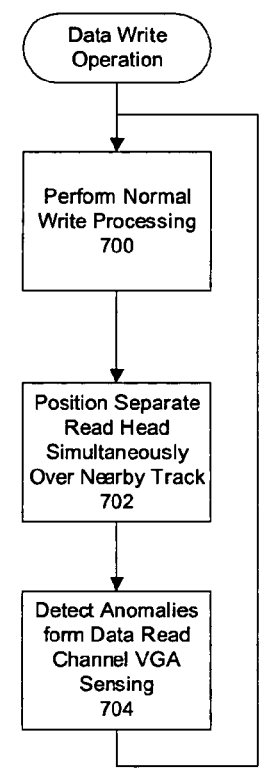
FIG. 7 is a flowchart describing parallel operation of exemplary anomalous event detection in conjunction with read channel operation while using the write head and write channel in accordance with features and aspects hereof.

In addition, anomaly detection features and aspects hereof may operate during write operations of the read/write head by operating the read head and associated read channel in parallel with operation of the write head and write channel operations. In some read/write head configurations, the read coil and write coil are separate circuits on the head assembly physically offset such that the write head may be positioned over one radial track position while the read head may be independently positioned over a nearby (e.g., adjacent) radial track position. FIG. 7 represents another high level method associated with features and aspects hereof to provide anomaly detection in the data read channel while the read/write head is presently in use for a write operation on a nearby or adjacent track position.

In particular, element 700 of FIG. 7 represents performing a normal write operation using the write coil and associated write channel electronics. Simultaneous with the write operation, the read portion of the read/write head is independently positioned over a nearby track (e.g., an adjacent track location). Utilizing the data read channel in parallel with the ongoing write operation, element 704 may detect anomalies in the disk drive operation using the data read channel VGA value changes while the write portion of the read/write head is simultaneously operable. Those of ordinary skill in the art will recognize that the features depicted in FIG. 7 are largely dependent on the particular geometry and configuration of a particular read/write head and its associated read channel and write channel electronics. Only particular read/write head assemblies and associated electronic circuits appropriately configured to allow simultaneous operation of both the read and write channels may utilize such an exemplary procedure.

Figure 8:
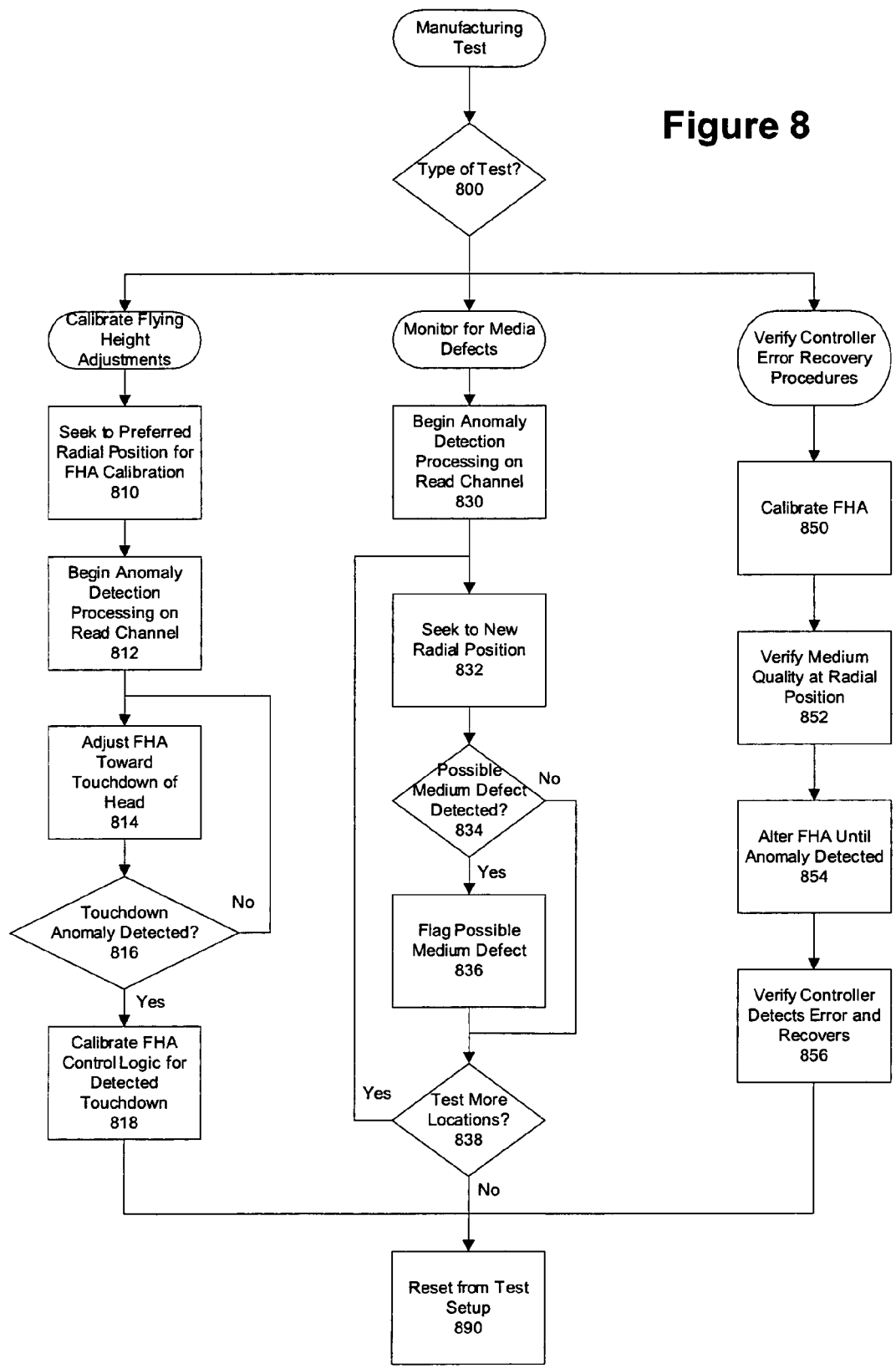
FIG. 8 is a flowchart describing an exemplary beneficial application anomalous event detection features and aspects hereof in manufacturing test applications.

FIG. 8 is a flowchart suggesting a high level application of features and aspects hereof to detect anomalous operation of a disk drive. As noted above, such anomaly detection may be particularly useful in a manufacturing test environment where aspects of the disk drive operation are to be calibrated or other operational aspects of the disk drive are to be verified. FIG. 8 therefore represents one exemplary useful application of features and aspects hereof to improve manufacturing test procedures. Element 800 is first operable to determine the type of test desired that may utilize anomaly detection features and aspects hereof. Elements 810 through 818 represent a method to calibrate the flying height adjustments of a read/write head relative to its corresponding recording surface. Elements 830 through 838 represent a method utilizing anomaly detection features and aspects hereof to detect defects in the surface of the recording medium associated with a particular read/write head. Lastly, elements 850 through 856 represent exemplary processing to verify proper error recovery procedures by the disk controller under test in response to a known or forced anomaly condition in operation of the read channel.

To perform a calibration of the flying height adjustment of a particular read/write head, element 810 is first operable to seek to a preferred radial position for performing the head flying height adjustment calibration. In calibrating the flying height adjustment of a read/write head, feed back control mechanisms associated with controlling the height of the head relative to the corresponding recording surface are adjusted to intentionally lower the height of the head until physical touchdown it detected. In a test environment it may be desirable to perform the physical touchdown of the read/write head on the recording surface at a preferred location generally away from normal data storage areas. Thus, element 810 moves the radial position of the read/write head to this preferred track location in preparation for the flying head flying height adjustment calibration.

Element 812 then begins the anomaly detection processing of the read channel information. As noted above, anomaly detection generally entails sensing sequences of changes in the VGA values automatically applied by the AGC control of the read channel. With this statistical monitoring proceeding in parallel, element 814 is operable to adjust the flying height adjustment parameters and control features of the disk controller to controllably lower the flying height of the read/write head. Element 816 is operable to determine when a touchdown anomaly condition is detected by the anomaly detection processing running in parallel. If no anomaly is yet detected, the process continues by iterating through elements 814 and 816 until the flying height adjustment reaches a point where the head touchdown anomaly is detected. At that point, element 818 is operable to appropriately calibrate the control mechanisms for maintaining flying height adjustment to indicate the now detected head touchdown location (i.e., the zero height position of the head relative to its corresponding recording surface). Element 890 is then operable to reset the disk controller features to resume normal operation (i.e., discontinuing as necessary the anomaly detection processing initiated by element 812).

As noted above, another form of anomaly that may be detected utilizing features and aspects hereof is a quality defect in the surface of the recording medium. Elements 830 through 838 are representative of exemplary method steps for performing such a media defect check using the anomaly detection features and aspects hereof. Element 830 is first operable to begin anomaly detection processing on the read channel. Element 832 then performs a seek operation to reposition the read/write head to a new radial track location. As the recording medium rotates underneath this new radial track position, element 834 is operable to determine whether the anomaly detection processing initiated by element 830 has detected a possible anomaly as a medium defect. Such an anomaly may be detected as statistical variance in the value applied to the VGA by the read channel's AGC. Short of actual physical touchdown of the read/write head on the associated recording surface, a surface defect may also be recognized by its signature statistical variance of the VGA values. The AGC will attempt to change the VGA amplification gain to improve the signal quality as the head passes over a defect area of its corresponding recording surface. If such an anomaly is detected, element 836 flags or otherwise signals the detection of a possible surface quality defect and its location on the recording surface (i.e., radial and longitudinal position or logical block number). The noted defect so detected may then be processed in accordance with well known defect mapping techniques and structures. Element 838 then determines if other radial positions need be tested for similar surface defect anomalies. If so, processing continues looping back to element 832 to seek to a next radial track location and to repeat the anomaly detection technique until all desired radial track locations are so tested. Those of ordinary skill in the art will recognize that a selected subset of track locations may be so tested to perform a preliminary pass/fail status of the quality of the recording surface(s). Or, every track location may be so tested to determine a precise map of all quality defect locations. Such options are well known to those of ordinary skill in the art as standard test features but as presented here the procedures are adapted to use the anomaly detection features and aspects hereof. Upon completion of all track locations to be tested (e.g., a subset of tracks or all tracks), element 890 is operable as above to reset the read channel and other control logic to resume normal operation or other test operations.

Elements 850 through 856 are operable to verify proper error recovery processing within the disk controller. Using anomaly detection features and aspects hereof, the test procedure may force or simulate a surface defect by changing the flying height of the read/write head until an anomaly event is detected by the features and aspects hereof. When such an anomaly is so detected, the test procedure may verify that the disk controller properly processes the error conditions that arise at the recording medium surface where the anomaly is forced or simulated. In particular, element 850 first calibrates the flying height adjustments (e.g., as discussed above). Element 852 then verifies the recording medium surface quality at some pre-determined radial track location (e.g., as discussed above). Element 854 then intentionally alters the read/write head flying height to force an anomalous conditions—i.e., to force and error in the read channel processing. The flying height adjustment may be raised or lowered to cause an anomalous condition and therefore simulate an error condition in the read channel. When element 864 has forced such a simulated error condition, element 856 then verifies proper recovery operation of the disk controller. Lastly, as above, element 890 then resets the disk controller features to prepare for normal operation or for other test procedures.

What is claimed is:

1. A disk drive having a read/write head and a corresponding recording surface and including:
   a read channel associated with the read/write head and having a feedback controlled variable gain amplifier ("VGA"); and
   a detector coupled to detect an anomaly in operation of the disk drive as a function of statistical changes in values related to the VGA feedback control, wherein the statistical changes comprise at least one of variance or standard deviation, and wherein the detector is adapted to detect touchdown of the read/write head on the corresponding recording surface.

2. The disk drive of claim 1 wherein the detector comprises programmed instructions executed within a disk drive controller of the disk drive.

3. The disk drive of claim 1 wherein the detector comprises a circuit associated with the read channel.

4. The disk drive of claim 1 wherein the detector is adapted to detect a quality defect on the surface of the corresponding recording surface.

5. The disk drive of claim 1 wherein the read channel includes a data read channel having a VGA_R signal representing values of the VGA of the data read channel and wherein the detector is adapted to detect the anomaly as a function of statistical changes in values related to the VGA_R signal.

6. The disk drive of claim 1 wherein the read channel includes a servo read channel having a VGA_S signal representing values of the VGA of the servo read channel and wherein the detector is adapted to detect the anomaly as a function of statistical changes in values related to the VGA_S signal.

7. A read channel circuit usable in a disk drive for reading information on a rotating recording medium associated with a read/write head coupled to the read channel, the read channel circuit including:
    an automatic gain control ("AGC") circuit including a variable gain amplifier ("VGA") and an associated feedback control circuit to automatically adjust the VGA in response to feedback sensing of signals detected by the read channel; and
    a variance detection circuit for detecting sample variance in adjustments to the VGA by the AGC that represent anomalous conditions of the disk drive, wherein the variance detection circuit is adapted to detect quality defects in the surface of the recording medium based on the detected variance of VGA adjustments.

8. The read channel circuit of claim 7 wherein the variance detection circuit is adapted to detect variations in the flying height of the read/write head based on the detected variance of VGA adjustments.

9. The read channel circuit of claim 8 wherein the variance detection circuit is further adapted to detect touchdown of the read/write head on the surface of the recording medium based on the detected variance of VGA adjustments.

10. A read channel in a disk drive controller adapted for reading and writing information on a rotating recording medium associated with a read/write head coupled to the controller through the read channel, the read channel including:
    an automatic gain control ("AGC") circuit including a variable gain amplifier ("VGA") and an associated feedback control circuit to automatically adjust the VGA in response to feedback sensing of signals detected by the read channel; and
    variance detection means within the controller coupled to sense the adjustments to the VGA and adapted for detecting sample variance in adjustments to the VGA by the AGC that represent anomalous conditions of the disk drive;
    wherein the variance detection means is adapted to detect variations in the flying height of the read/write head, and touchdown of the read/write head on the surface of the recording medium, based on the detected variance of VGA adjustments.

11. The read channel of claim 10 wherein the variance detection means is adapted to detect quality defects in the surface of the recording medium based on the detected variance of VGA adjustments.

12. An apparatus in a disk controller having a read/write head and a corresponding rotating recording surface, the apparatus comprising:
    a read channel coupled to the read/write head for sensing information recorded on the rotating recording surface; and
    a touchdown detector communicatively coupled to the read channel and adapted to detect touchdown of the read/write head at any radial position on the recording surface regardless of the skew angle of the read/write head relative to tracks on the recording surface based on information derived from the read channel;
    wherein the read channel includes a variable gain amplifier ("VGA") automatically controlled by an automatic gain control ("AGC") circuit including a feedback control logic circuit, and
    wherein information derived from the read channel by the touchdown detector further comprises variance in the value of the VGA by the AGC.

13. In a disk drive having a read/write head and an associated rotating recordable medium, a method for detecting anomalous conditions in operation of the disk drive, the method comprising:
    sensing values applied to a variable gain amplifier ("VGA") by an automatic gain control ("AGC") feedback control circuit associated with the read/write head;
    detecting an anomalous condition as a function of statistical changes of the sensed values applied to the VGA, wherein the statistical changes comprise at least one of variance or standard deviation of the sensed values applied to the VGA; and
    detecting quality defects on the recording medium as a function of variance of the sensed values.

14. The method of claim 13 wherein the step of detecting further comprises:
    detecting touchdown of the read/write head on the recording medium as a function of variance of the sensed values.

15. The method of claim 13 wherein the VGA comprises a data read channel VGA ("VGA_R") and wherein the step of detecting further comprises:
    detecting an anomalous condition as a function of statistical variance of the sensed values applied to the VGA_R.

16. The method of claim 13 wherein the VGA comprises a servo read channel VGA ("VGA_S") and wherein the step of detecting further comprises:
    detecting an anomalous condition as a function of statistical variance of the sensed values applied to the VGA_S.

17. In a disk drive having a read/write head and an associated rotating recordable medium, an apparatus for detecting anomalous conditions in operation of the disk drive, the apparatus comprising:
    means for sensing values applied to a variable gain amplifier ("VGA") by an automatic gain control ("AGC") feedback control circuit associated with the read/write head; and
    means for detecting an anomalous condition as a function of sample variance of the sensed values applied to the VGA;
    wherein the means for detecting further comprises means for detecting touchdown of the read/write head on the recording medium as a function of variance of the sensed values.

18. The apparatus of claim 17 wherein the means for detecting further comprises:
    means for detecting quality defects on the recording medium as a function of variance of the sensed values.

19. The apparatus of claim 17 wherein the VGA comprises a data read channel VGA ("VGA_R") and wherein the means for detecting further comprises:

means for detecting an anomalous condition as a function of statistical variance of the sensed values applied to the VGA_R.

20. The apparatus of claim 17 wherein the VGA comprises a servo read channel VGA ("VGA_S") and wherein the means for detecting further comprises:

means for detecting an anomalous condition as a function of statistical variance of the sensed values applied to the VGA_S.

21. The apparatus of claim 17 wherein the means for detecting further comprises:

means for detecting an anomalous condition as a function of variance of the sensed values applied to the VGA.

22. The apparatus of claim 17 wherein the means for detecting further comprises:

means for detecting an anomalous condition as a function of standard deviation of the sensed values applied to the VGA.

23. In a disk controller, an apparatus comprising:

means for gathering spectral energy in a predetermined frequency band associated with a read/write head in the disk drive; and means for detecting an anomalous condition in the operation of the disk drive in response to detecting spectral energy above a predetermined threshold value in the predetermined frequency band;

wherein the means for gathering further comprises means for computing statistical variance of values applied to a variable gain amplifier ("VGA") associated with the read/write head.

24. The apparatus of claim 23 wherein the predetermined frequency band is a frequency band surrounding a resonant frequency of vibration of the read/write head.

25. The apparatus of claim 24 wherein the predetermined frequency band is 50-300 kHz.

26. A method operable in a disk drive having a disk controller coupled to a read/write head where the read/write head is associated with a variable gain amplifier ("VGA"), the method comprising:

gathering spectral energy in a predetermined frequency band associated with the read/write head in the disk drive; and detecting an anomalous condition in the operation of the disk drive in response to detecting spectral energy above a predetermined threshold value in the predetermined frequency band;

wherein the step of gathering further comprises computing statistical variance of values applied to a variable gain amplifier ("VGA") associated with the read/write head.

27. The method of claim 26 wherein the predetermined frequency band is a frequency band surrounding a resonant frequency of vibration of the read/write head.

28. The method of claim 27 wherein the predetermined frequency band is 50-300 kHz.

* * * * *